(12) United States Patent
Sun

(10) Patent No.: US 11,387,918 B2
(45) Date of Patent: Jul. 12, 2022

(54) MULTI-TONE COMMUNICATION SYSTEM, MULTI-TONE SIGNAL DEMODULATION DEVICE THEREOF, AND METHOD THEREOF

(71) Applicant: NUVOTON TECHNOLOGY CORPORATION, Hsinchu (TW)

(72) Inventor: Chiyung Sun, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 490 days.

(21) Appl. No.: 16/578,625

(22) Filed: Sep. 23, 2019

(65) Prior Publication Data

US 2020/0136730 A1    Apr. 30, 2020

(30) Foreign Application Priority Data

Oct. 24, 2018  (TW) .................................. 107137566

(51) Int. Cl.
| | | |
|---|---|---|
| H04B 11/00 | (2006.01) | |
| G08B 21/18 | (2006.01) | |
| H04L 27/26 | (2006.01) | |

(52) U.S. Cl.
CPC ............. *H04B 11/00* (2013.01); *G08B 21/18* (2013.01); *H04L 27/2647* (2013.01)

(58) Field of Classification Search
CPC ..... H04B 11/00; G08B 21/18; H04L 27/2647; H04L 27/30; H04L 27/06; H04L 27/066; H04L 27/10; H04L 27/103; H04L 27/14; H04L 27/142; H04L 27/144; H04L 27/2601; G10L 19/02; G10L 15/26; G10L 19/008

See application file for complete search history.

(56) References Cited

U.S. PATENT DOCUMENTS

| | | | | |
|---|---|---|---|---|
| 3,427,617 | A * | 2/1969 | Richman | .................... G01S 7/36 367/90 |
| 3,497,625 | A * | 2/1970 | Oxley | ................. H04L 27/0008 375/279 |
| 3,513,399 | A * | 5/1970 | Wycoff | ............... H04W 88/027 340/7.49 |
| 3,824,470 | A * | 7/1974 | Eastmond | .............. H04B 7/084 455/701 |

(Continued)

*Primary Examiner* — Hai Phan
*Assistant Examiner* — Son M Tang
(74) *Attorney, Agent, or Firm* — Muncy, Geissler, Olds & Lowe, PC

(57) ABSTRACT

A multi-tone communication system, a multi-tone signal demodulation device and a method thereof are provided. The multi-tone communication system includes a modulation device and a demodulation device. The modulation device can generate and broadcast a multi-tone audio signal corresponding to a control command. The demodulation device includes a sound receiving module, a data processor and a controller. The sound receiving module can receive the multi-tone audio signal. The data processor can process the multi-tone audio signal to obtain at least two tones carried on the multi-tone audio signal, and determine whether frequency drifts of the at least two tones are consistent, and if yes, the data processor decodes the at least two tones to generate an execution command. The controller executes the execution command.

10 Claims, 6 Drawing Sheets

(56) References Cited

U.S. PATENT DOCUMENTS

| | | | | |
|---|---|---|---|---|
| 3,911,395 A | * | 10/1975 | Koike | H04L 1/004 714/810 |
| 3,918,054 A | * | 11/1975 | Collins | G01S 13/28 342/192 |
| 3,986,126 A | * | 10/1976 | Gindi | H04L 7/033 327/141 |
| 4,035,767 A | * | 7/1977 | Chen | H04L 1/0059 375/283 |
| 4,042,788 A | * | 8/1977 | Richards | H04Q 1/457 379/283 |
| 4,118,599 A | * | 10/1978 | Iwahara | H04S 5/02 381/1 |
| 4,234,852 A | * | 11/1980 | McCorkle | H04L 27/144 375/337 |
| 4,308,614 A | * | 12/1981 | Fisher | H04B 1/12 370/497 |
| 4,425,666 A | * | 1/1984 | Groth, Jr. | H04L 27/10 375/283 |
| 4,748,639 A | * | 5/1988 | Feggeler | H04B 7/005 375/139 |
| 5,260,975 A | * | 11/1993 | Saito | H04L 1/0001 329/346 |
| 5,376,939 A | * | 12/1994 | Urkowitz | G01S 7/42 342/134 |
| 5,517,433 A | * | 5/1996 | Morrison | H04L 27/12 708/3 |
| 5,640,415 A | * | 6/1997 | Pandula | H04B 1/713 380/34 |
| 5,802,112 A | * | 9/1998 | Ganter | H04L 27/2602 379/386 |
| 6,046,595 A | * | 4/2000 | Wardle | G01R 27/28 702/109 |
| 6,208,959 B1 | * | 3/2001 | Jonsson | G10L 19/00 704/203 |
| 6,603,822 B2 | * | 8/2003 | Brede | H04J 3/14 398/99 |
| 6,650,719 B1 | * | 11/2003 | Baker | H04N 17/004 370/516 |
| 6,760,276 B1 | * | 7/2004 | Karr | G10K 15/02 340/7.49 |
| 6,839,381 B1 | * | 1/2005 | Sheng | H04L 27/0014 375/321 |
| 6,985,749 B2 | * | 1/2006 | Bannasch | H04L 25/4902 455/296 |
| 7,184,506 B2 | * | 2/2007 | Kolze | H04L 27/0014 375/362 |
| 8,509,328 B2 | * | 8/2013 | Michael | H04L 27/2657 455/63.1 |
| 8,841,923 B1 | * | 9/2014 | Vanwiggeren | G01R 19/0053 324/606 |
| 9,503,200 B2 | * | 11/2016 | Sun | H04B 11/00 |
| 10,454,600 B2 | * | 10/2019 | Leibfritz | H04B 17/364 |
| 2003/0185326 A1 | * | 10/2003 | Kolze | H04L 27/2657 375/373 |
| 2004/0170381 A1 | * | 9/2004 | Srinivasan | G10L 19/0212 386/338 |
| 2004/0264977 A1 | * | 12/2004 | Yap | H03B 28/00 398/161 |
| 2010/0054197 A1 | * | 3/2010 | Taylor | H04L 69/08 370/395.5 |
| 2010/0213924 A1 | * | 8/2010 | Osumi | G01R 31/2836 324/76.44 |
| 2011/0192226 A1 | * | 8/2011 | Hayner | G01C 19/5776 73/504.12 |
| 2014/0043485 A1 | * | 2/2014 | Bateman | H04N 7/181 348/159 |
| 2014/0070072 A1 | * | 3/2014 | Kuo | G01J 9/04 250/201.1 |
| 2014/0348344 A1 | * | 11/2014 | Sun | H04B 11/00 381/98 |
| 2015/0172040 A1 | * | 6/2015 | Pelekhaty | H04J 14/0226 398/79 |
| 2017/0082756 A1 | * | 3/2017 | Parikh | G01S 19/235 |
| 2017/0288805 A1 | * | 10/2017 | Yim | H04L 9/0625 |
| 2018/0302179 A1 | * | 10/2018 | Leibfritz | G01R 27/32 |

* cited by examiner

MULTI-TONE COMMUNICATION SYSTEM, MULTI-TONE SIGNAL DEMODULATION DEVICE THEREOF, AND METHOD THEREOF

CROSS-REFERENCE TO RELATED APPLICATION

This application claims the benefit of Taiwan Patent Application No. 107137566, filed on Oct. 24, 2018, in the Taiwan Intellectual Property Office, the disclosure of which is incorporated herein in its entirety by reference.

BACKGROUND OF THE INVENTION

1. Field of the Invention

The present invention relates to a multi-tone communication technology, more particularly to a multi-tone communication system which is able to reduce hardware cost and reduce frequency drift effect, and a multi-tone signal demodulation device thereof, and a method thereof.

2. Description of the Related Art

Multi-tone communication technology has been widely used in many applications. However, when the usage environment is noisy, the multi-tone demodulation device is affected by noise easily and the accuracy of demodulation is degraded. For this reason, in many applications, an infrared module or a Bluetooth module is used for data transmission, thereby achieving higher signal transmission accuracy; however, the hardware cost is also increased.

For example, when the multi-tone communication technology is applied to an alarm system, a user can operate a mobile phone to generate a multi-tone signal, and a multi-tone demodulation device of the alarm system is disposed on the ceiling and uses a battery as a power source. When the alarm system outputs alarm sound, the whole environment is quite noisy, and the multi-tone demodulation device is possibly affected by noise, and it makes the demodulation accuracy decrease. In addition, in order to reduce the cost, the multi-tone demodulation device of the alarm system uses a resistor-capacitor oscillating circuit, rather than a crystal oscillator; however, the using the resistor-capacitor oscillating circuit affects the demodulation accuracy.

SUMMARY OF THE INVENTION

In order to solve aforementioned problems, the present invention provides a multi-tone communication system, the multi-tone signal demodulation device, and a multi-tone demodulation method.

According to an embodiment, the present invention provides a multi-tone communication system comprising a modulation device and a demodulation device. The modulation device includes a man-machine interface module, a data processor and a speaker module. The man-machine interface module is configured to receive a control command. The data processor is configured to store at least three pieces of tone data and a first correspondence table, and comprises a calculating unit configured to select at least two of the at least three pieces of tone data according to the first correspondence table, and use the selected at least two pieces of tone data to generate a multi-tone signal corresponding to the control command. The speaker module is configured to broadcast the multi-tone signal. The demodulation device includes a sound receiving module, a data processor and a controller. The sound receiving module is configured to receive the multi-tone signal. The data processor is configured to process the multi-tone signal to obtain the pieces of tone data of the multi-tone signal, and determine whether frequency drifts of the pieces of tone data are the same, wherein when the frequency drifts of the pieces of tone data are the same, the data processor decodes the pieces of tone data, to generate an execution command. The controller is configured to execute the execution command. The first correspondence table records a corresponding relationship of the at least three pieces of tone data and a plurality of control commands.

According to an embodiment, the modulation device is disposed in a movable device, and the speaker module is a speaker of the movable device, and an upper frequency limit of the at least three pieces of tone data is a highest frequency emitted by the speaker.

According to an embodiment, the demodulation device is disposed in an alarm system, the sound receiving module is a microphone of the alarm system, and the controller executes the execution command to control the alarm system.

According to an embodiment, the data processor comprise at least three tone frequency drift detection modules, a tone determining module and a command decoding module, and the at least three tone frequency drift detection modules perform energy calculation and frequency drift detection on the multi-tone signal, to generate a plurality of tone energy values and a plurality of tone drift values, respectively, the tone determining module determines, according to the plurality of tone energy values and the plurality of tone drift values, whether the multi-tone signal is generated by modulating at least two pieces of tone data, and the command decoding module comprises a second correspondence table, and when the tone determining module determines that the multi-tone signal is generated by modulating at least two pieces of tone data, the command decoding module decodes a determination result of the tone determining module according to the second correspondence table, to generate the execution command. The second correspondence table records a corresponding relationship of the plurality of pieces of tone data and a plurality of execution commands.

According to an embodiment, each of the at least three tone frequency drift detection modules comprises a plurality of filter units and a selecting unit, the plurality of filter unit have different sampling frequencies, and each of the plurality of filter units performs energy calculation on the multi-tone signal, to generate an energy value, the selecting unit selects a maximal energy value from the plurality of energy values calculated by the plurality of filter units, and output the maximal energy value serves as the tone energy value, and the selecting unit of each of the at least three tone frequency drift detection modules outputs an ID code of the filter unit calculating the maximal energy values, as the tone drift value.

According to an embodiment, each of the filter units comprises a plurality of sin-wave data tables, a plurality of correlation calculating units and an adder, and the plurality of correlation calculating units performs correlation calculation on the multi-tone signal according to the plurality of sin-wave data tables, respectively, so as to generate a plurality of correlation values, and the adder sums up the plurality of correlation values, to generate the energy value.

According to an embodiment, the present invention provides a multi-tone signal demodulation device comprising a sound receiving module, a data processor and a controller.

The sound receiving module is configured to receive a multi-tone signal. The data processor is configured to process the multi-tone signal to obtain at least two pieces of tone data of the multi-tone signal, and determine whether frequency drifts of the at least two pieces of tone data are the same, and when the frequency drifts of the at least two pieces of tone data are the same, the data processor decodes the at least two pieces of tone data, to generate an execution command. The controller is configured to execute the execution command.

According to an embodiment, the data processor comprises at least three tone frequency drift detection modules configured to perform calculation on the multi-tone signal, to generate a plurality of tone energy values and a plurality of tone drift values, respectively, and each of the at least three tone frequency drift detection modules comprises a plurality of filter units and a selecting unit, the plurality of filter units have different sampling frequencies, and each of the plurality of filter units performs energy calculation on the multi-tone signal, to generate an energy value, the selecting unit selects a maximal energy values from the plurality of energy values calculated by the plurality of filter units, and outputs the maximal energy values as the tone energy value, and the selecting unit outputs an ID code of the filter unit calculating the maximal energy values as the tone drift value.

According to an embodiment, when the data processor determines that the frequency drifts of the at least two pieces of tone data are not the same, the data processor does not decode the at least two pieces of tone data.

According to an embodiment, the present invention provides a multi-tone signal demodulation method comprising steps of: receiving a multi-tone signal; processing the multi-tone signal, to obtain at least two pieces of tone data; calculating frequency drifts of the at least two pieces of tone data; determining whether the frequency drifts of the at least two pieces of tone data are the same; and decoding the at least two pieces of tone data to generate an execution command when the frequency drifts of the at least two pieces of tone data are the same.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
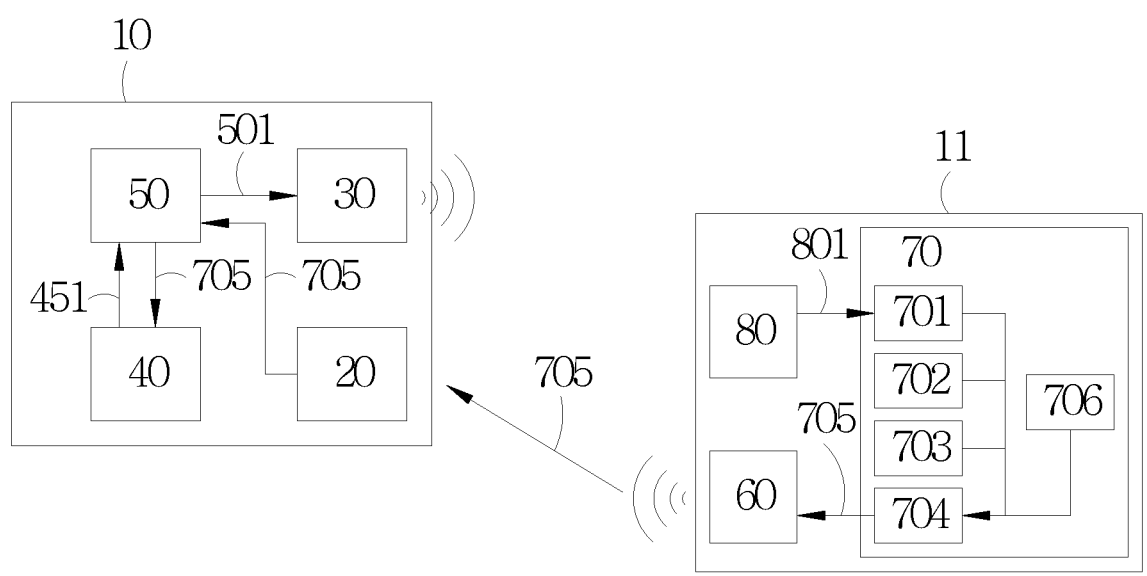
FIG. 1 is a block diagram of a multi-tone communication system of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Please refer to FIG. 1, which is a block diagram of a multi-tone communication system of the present invention. As shown in FIG. 1, the multi-tone communication system includes a modulation device 11 and a demodulation device 10. The modulation device 11 comprise a man-machine interface module 80, a data processor 70 and a speaker module 60. The man-machine interface module 80 can receive a control command 801.

The data processor 70 stores at least three pieces of tone data 701, 702 and 703, and a first correspondence table 706, and the data processor 70 comprises a calculating unit 704 configured to select at least two of the at least three pieces of tone data 701, 702 and 703 according to the first correspondence table 706, and use the selected at least two pieces of tone data to generate a multi-tone signal 705 corresponding to the control command 801. The speaker module 60 is configured to broadcast the multi-tone signal 705. In actual application, the multi-tone signal 705 can be digital data, and the speaker module 60 can convert the multi-tone signal 705 into acoustic wave and then broadcast the acoustic wave externally. It should be noted that the multi-tone modulation technology is well known for a person having ordinary skill in the art, and the key technical feature of the present invention is to solve a frequency drift problem of the demodulation device, so the detailed description of the multi-tone modulation technology is not repeated herein.

The demodulation device 10 comprises a sound receiving module 20, a data processor 40, and a controller 50. The sound receiving module 20 can receive the multi-tone signal 705, and the data processor 40 can process the multi-tone signal 705 to obtain the at least two pieces of tone data carried on the multi-tone signal 705, and determine whether the frequency drifts of the at least two pieces of tone data are the same; when the frequency drifts of the at least two pieces of tone data are the same, the data processor 40 decodes the at least two pieces of tone data to generate an execution command 451. Next, the controller 50 can execute the execution command 451.

In actual application, the modulation device 11 can be a cell phone, and the demodulation device 10 can be disposed in an alarm system, and the demodulation device 10 includes a speaker module 30 for emitting alarm sound. The man-machine interface module 80 comprise a touch screen or a button of the cell phone, so that the user can operate the touch screen or the button to generate the control command 801. For example, when the alarm system is emitting alarm sound, if the alarming matter is released or dangerous accident is ruled out, the user can output the control command 801, such as command of releasing alarm, through the touch screen or the button of the cell phone, and the control command 801 can be transmitted to the demodulation device 10 through the multi-tone signal 705; as a result, the controller 50 executes the command of releasing alarm, to stop the alarm sound.

The first correspondence table 706 records a corresponding relationship of the plurality of pieces of tone data 701 to 703 and a plurality of control commands 801, for example, the multi-tone signal 705 corresponding to the control command of releasing alarm is modulated by the first tone data 701 and the second tone data 702; the multi-tone signal 705 corresponding to the control command of starting alarm is modulated by the first tone data 701 and the third tone data 703; the multi-tone signal 705 corresponding to the control command 801 of setting alarm condition is modulated by the second tone data 702 and the third tone data 703.

In an embodiment, the speaker module 60 can be a speaker of the cell phone, and frequencies of the pieces of tone data 701 to 703 are, preferably, in a range of 14 KHz to 20 KHz; for example, in order to prevent the user from feeling uncomfortable subject to the multi-tone signal 705, a lower frequency limit value of the pieces of tone data 701 to 703 can be set in an upper frequency limit range audible for human, for example, lower frequency limit value of the pieces of tone data 701 to 703 can be set as 14 KHz. An upper frequency limit of the pieces of tone data 701 to 703 can be set as the highest frequency of sound emitted by the speaker of the cell phone; for example, in this embodiment, the upper frequency limit value of the pieces of tone data 701 to 703 is 20 KHz.

In an embodiment, the sound receiving module 20 can be a microphone of the alarm system. Since it is very noisy while the alarm system emits alarm sound, the audio signal received by the sound receiving module 20 is interfered easily, and the data processor 40 must further process the multi-tone signal 705 to confirm whether the related execution command is carried in the multi-tone signal 705. Furthermore, in order to decrease hardware cost of device, the demodulation device 10 of the present invention use a resistor-capacitor oscillation circuit for generating clock signal, rather than a crystal oscillator; however, the frequency of the clock signal generated by the resistor-capacitor oscillation circuit is affected easily subject to temperature, process or other environmental factor, and it possibly causes the problem of sampling frequency drift for the filter of the demodulation device 10.

The data processor 40 can determine whether the received audio signal has at least two tones with high energies, and when the received audio signal has at least two tones with high energies, it indicates that the receives audio signal possibly carries a command. After determining that the receives audio signal is the multi-tone signal 705, the data processor 40 then determines whether the frequency drifts of the tones in multi-tone signal 705 are consistent, and when the frequency drifts of the tones in multi-tone signal 705 are consistent, the data processor 40 decodes the multi-tone signal 705 to generate the execution command 451. It should be noted that the execution command 451 and the control command 801 are the same command, but merely for convenience in describing operation of the multi-tone communication system of the present invention, the command of the modulation device 11 is referred to the control command 801 and the command of the demodulation device 10 is referred to the execution command 451.

In the embodiment, the data processor 40 comprises three tone frequency drift detection modules 41 to 43, a tone determining module 44 and a command decoding module 45. The three tone frequency drift detection modules 41 to 43 can perform energy calculation and frequency drift detection on the multi-tone signal 705, so as to generate tone energy values 416 to 436 and tone drift values 417 to 437, respectively.

The tone determining module 44 can determine, according to the 走 tone energy values 416 to 436s and the tone drift values 417 to 437, whether the multi-tone signal 705 is generated by modulating at least two pieces of tone data. The data processor 40 can comprise a second correspondence table 450. When the tone determining module 44 determines that the multi-tone signal 705 is formed by modulating two pieces of tone data, the data processor 40 can decode a determination result of the tone determining module 44, according to the second correspondence table 450, so as to generate the execution command 451.

Figure 2:
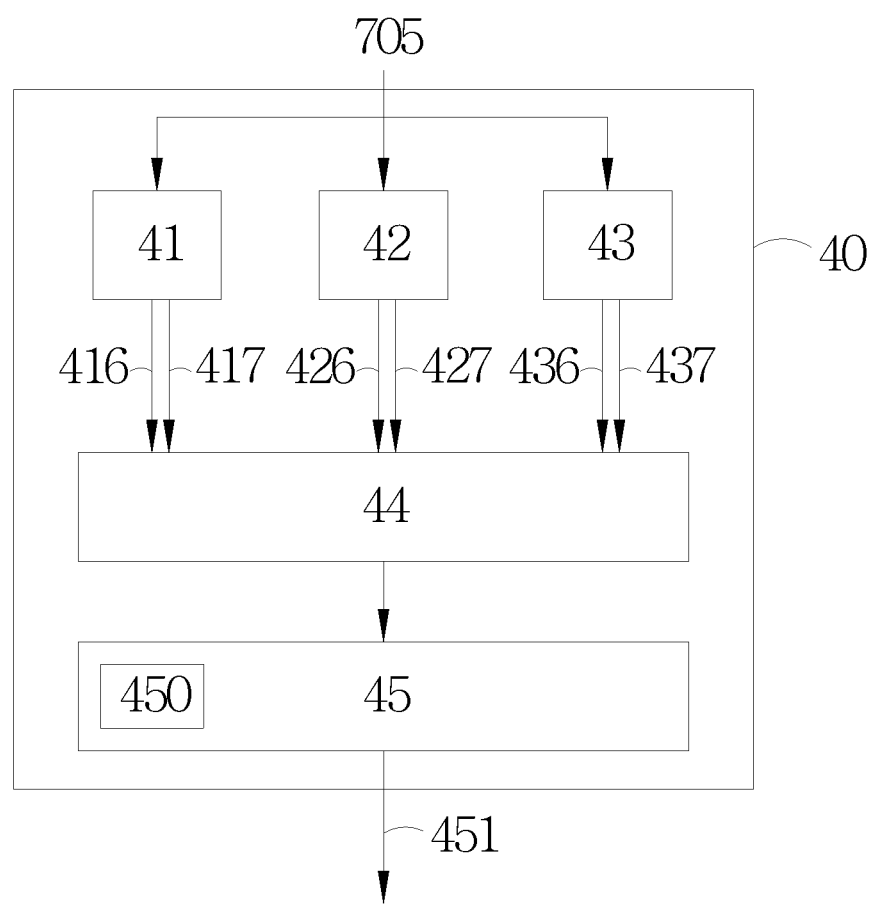
FIG. 2 is a block diagram of an embodiment of a data processor of a multi-tone communication system of the present invention.
Figure 3:
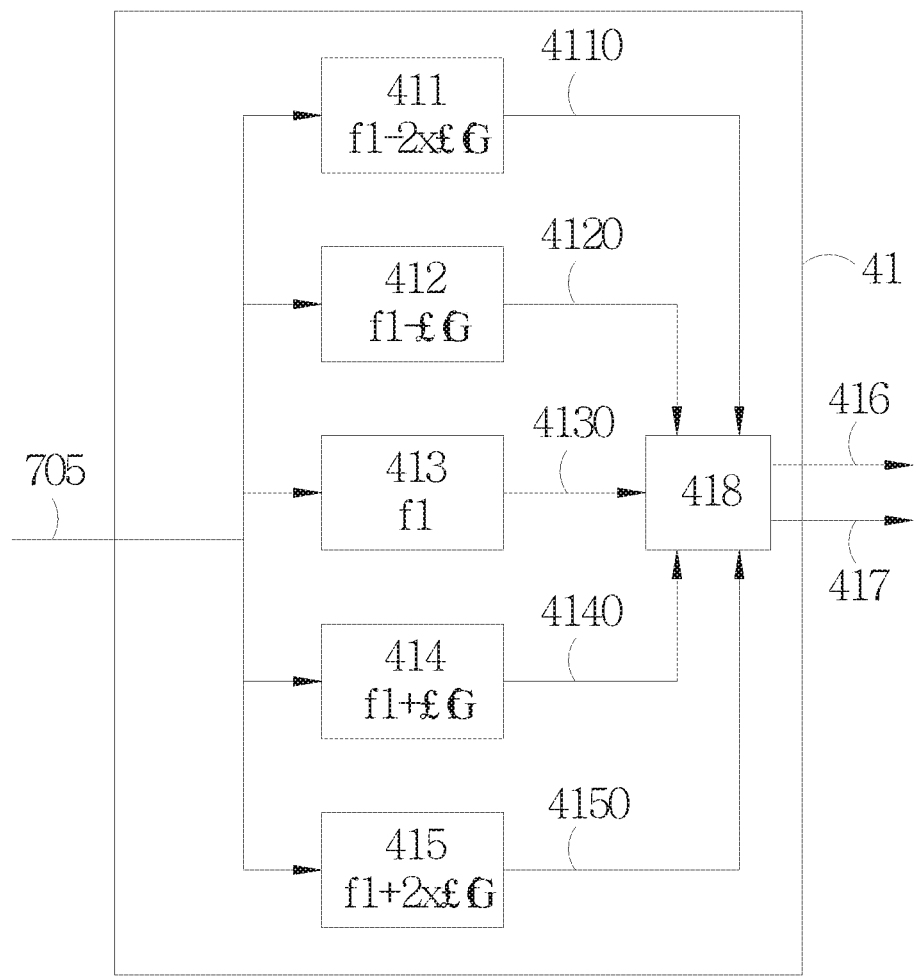
FIG. 3 is a block diagram of an embodiment of a tone frequency drift detection module of a data processor of the present invention.

Please refer to FIGS. 2 and 3, which show a block diagram of an embodiment of a data processor of a multi-tone communication system of the present invention, and a block diagram of an embodiment of a tone frequency drift detection module of a data processor of the present invention. As shown in FIG. 2, the data processor 40 can comprise a first tone frequency drift detection module 41, a second tone frequency drift detection module 42 and a third tone frequency drift detection module 43 which are configured to perform energy calculation and frequency drift detection on the multi-tone signal 705 according to tone frequencies f1, f2 and f3, respectively, so as to generate a first tone energy value 416 and a first tone drift value 417, a second tone energy value 426 and a second tone drift value 427, and a third tone energy value 436 and a third tone drift value 437, respectively. It should be noted that, in the embodiment, the multi-tone signal 705 is formed by modulating two pieces of tone data selected from the three pieces of tone data, so the data processor 40 comprises three tone frequency drift detection modules for demodulation; however, the present invention is not limit thereto. In other implementations, when the multi-tone signal 705 is formed by modulating at least two pieces of tone data selected from four pieces of tone data, the data processor 40 can comprise four tone frequency drift detection modules; when the multi-tone signal 705 is formed by modulating two pieces of tone data selected from five pieces of tone data, the data processor 40 can comprise five tone frequency drift detection modules, and so on.

Please refer to FIG. 3. In an embodiment, the first tone frequency drift detection module 41 can comprise a first filter unit 411, a second filter unit 412, a third filter unit 413, a fourth filter unit 414, a fifth filter unit 415, and a selecting unit 418. The first filter unit 411, the second filter unit 412, the third filter unit 413, the fourth filter unit 414 and the fifth filter unit 415 have different sampling frequencies. In the embodiment shown in FIG. 3, the sampling frequency of the first filter unit 411 is frequency f1−2×Δf, the sampling frequency of the second filter unit 412 is frequency f1−Δf, the sampling frequency of the third filter unit 413 is frequency f1, the sampling frequency of the fourth filter unit 414 is frequency f1+Δf, the sampling frequency of the fifth filter unit 415 is frequency f1+2×Δf; in other words, the first tone frequency drift detection module 41 comprises the plurality of filter units with the sampling frequencies increased or decreased by an unit of Δf about the preset tone frequency f1 thereof, and the obtained five frequencies are used as the sampling frequencies of the first filter unit 411, the second filter unit 412, the third filter unit 413, the fourth filter unit 414 and the fifth filter unit 415, respectively. The frequency offset Δf is used for facilitating to determine the tone drift value of the multi-tone signal 705. Similarly, the second tone frequency drift detection module 42 is set with a preset tone frequency f2, and the sampling frequencies of first filter unit 411, the second filter unit 412, the third filter unit 413, the fourth filter unit 414 and the fifth filter unit 415 of the second tone frequency drift detection module 42 are f2−2×Δf, f2−Δf, f2, f2+Δf, f2+2×Δf, respectively. The third tone frequency drift detection module 43 is set with a preset tone frequency f3, and the sampling frequencies of the first filter unit 411, the second filter unit 412, the third filter unit 413, the fourth filter unit 414 and the fifth filter unit 415 of the third tone frequency drift detection module 43 are f3−2×Δf, f3−Δf, f3, f3+Δf, f3+2×Δf, respectively.

It should be noted that the number of the filter units of the tone frequency drift detection module shown in FIG. 3 is merely for exemplary illustration, and the present invention is not limited thereto. For example, in an embodiment, each of the plurality of tone frequency drift detection modules can comprise three filter units with sampling frequencies f−Δf, f, f+Δf, respectively; in another embodiment, each of the plurality of tone frequency drift detection modules can comprise seven filter units having sampling frequencies f−3×Δf, f−2×Δf, f×Δf, f, f+Δf, f+2×Δf, f+3×Δf, respectively. Upon demand, the number of the filter units can be even. Furthermore, in this embodiment, since each filter unit uses the resistor-capacitor oscillation circuit for generating clock signal, rather than the crystal oscillator, so the frequency drift effect possibly occurs.

In the first tone frequency drift detection module 41, the filter units 411 to 415 calculate the tone energy values 4110 to 4150 of the multi-tone signal 705, respectively, according to sampling frequencies thereof, and the selecting unit 418 then selects the maximal tone energy value from the five tone energy values 4110 to 4150, and output the maximal tone energy value as a first tone energy value 416, and also output an ID code of the filter unit calculating the first tone energy value 416 as the first tone drift value 417. Theoretically, when the multi-tone signal 705 is modulated with a sampling frequency of a filter unit, the filter unit can calculate a higher tone energy value; otherwise, when the multi-tone signal 705 is not modulated with the sampling frequency of the filter unit, tone energy value calculated by the filter unit can be almost 0. In actual application, the sound receiving module 20 can also receive environmental noise possibly, so all of the first filter unit 411, the second filter unit 412, the third filter unit 413, the fourth filter unit 414 and the fifth filter unit 415 can calculate the tone energy values.

Since each filter unit uses the resistor-capacitor oscillation circuit, rather than the crystal oscillator, so the sampling frequency of the filter unit possibly drifts. For example, in a condition that the preset sampling frequency of the third filter unit 413 of the first tone frequency drift detection module 41 is f1, when frequency drift effect occurs, the third filter unit 413 is operated with the sampling frequency f1−Δf; similarly, in a condition that the sampling frequencies of the first filter unit 411, the second filter unit 412, the fourth filter unit 414 and the fifth filter unit 415 of the first tone frequency drift detection module 41 are f1−3×Δf, f1−2×Δf, f1−Δf, f1, f1+Δf, respectively. In this example, when the multi-tone signal 705 carries the tone of frequency f1, the tone energy value calculated by the fourth filter unit 414 of the first tone frequency drift detection module 41 is higher than that of the other four filter units, and the selecting unit 418 of the first tone frequency drift detection module 41 output the ID code "4" as the first tone drift value 417.

Similarly, when the frequency drift effect occurs and the operating sampling frequency of the third filter unit 413 is changed to f1+2×Δf, the actual operating sampling frequencies of the first filter unit 411, the second filter unit 412, the third filter unit 413, the fourth filter unit 414 and the fifth filter unit 415 of the first tone frequency drift detection module 41 are f1, f1+Δf, f1+2×Δf, f1+3×Δf, f1+4×Δf, respectively; in this case, when the multi-tone signal 705 carries the tone of frequency f1, the tone energy value calculates by the first filter unit 411 of the first tone frequency drift detection module 41 is higher than that of the other four filter units, and the selecting unit 418 of the first tone frequency drift detection module 41 outputs the ID code "1" as the first tone drift value 417.

Figure 4:
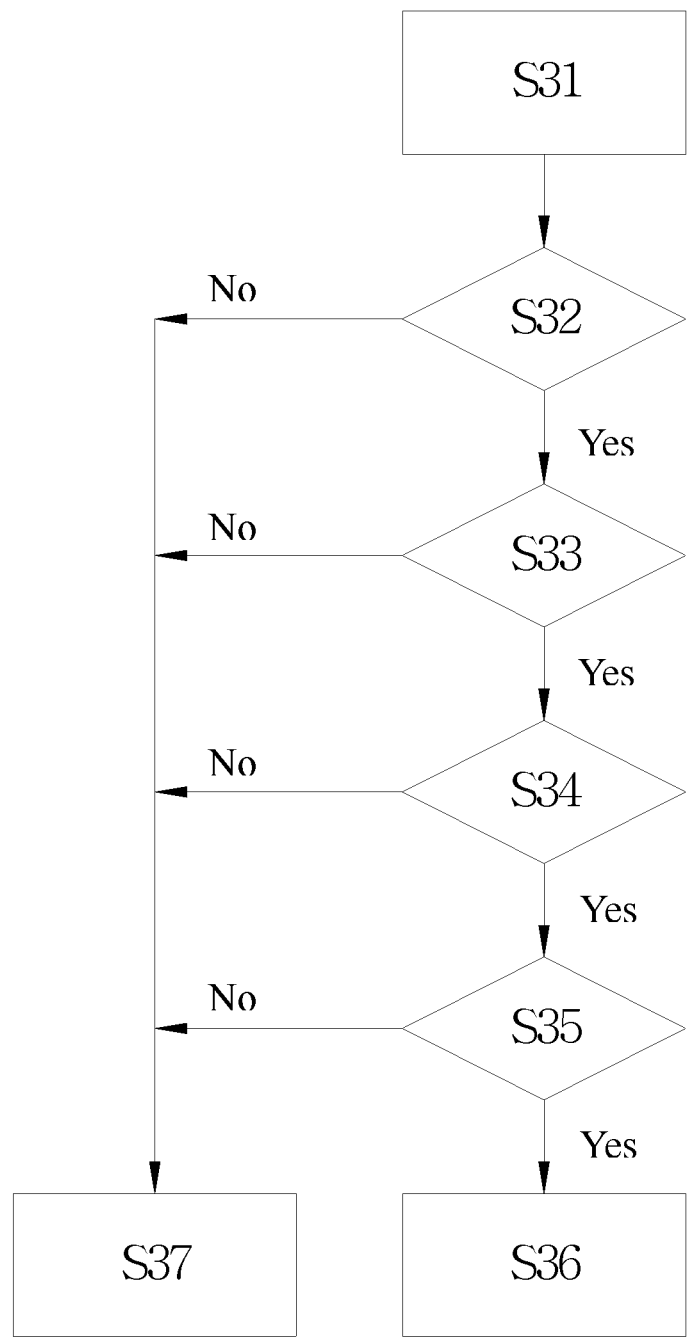
FIG. 4 is a flowchart showing the steps in an operation of a tone frequency drift detection module of the present invention.

After receiving the tone energy values 416 to 436 and the tone drift values 417 to 437, the tone determining module 44 executes a determination operation to check whether the multi-tone signal 705 is formed by modulating preset tone data. Please refer to FIG. 4. In the embodiment, the tone determining module 44 executes step S31 to S37, to determine whether the multi-tone signal 705 is generated by modulating at least two pieces of tone data.

In a step S31, the tone determining module 44 selects the top three tone energy values from the received tone energy values 416 to 436. It should be noted that, in this embodiment, the multi-tone signal 705 is formed by modulating two pieces of tone data, so the top three tone energy value are selected in the step S3; in other implementations, when the multi-tone signal 705 is generated by modulating three pieces of tone data, the top four tone energy values are selected in the step S31, and so on.

In a step S32, the tone determining module 44 determines whether the difference between the top two tone energy values and the third highest tone energy value is high enough; when the difference between the top two tone energy values and the third highest tone energy value is high enough, the operational flow enters a step S33; when the difference between the top two tone energy values and the third highest tone energy value is not high enough, the operational flow enters a step S37, to wait for next multi-tone signal. In an embodiment, the tone determining module 44 can comprise a first preset ratio, and determine whether a ratio of the highest tone energy value and the third highest tone energy value is higher than a first preset ratio, and also determine whether a ratio of the second highest tone energy value and the third highest tone energy value is higher than the first preset ratio, if yes, the tone determining module 44 can determine that the difference between the top two tone energy values and the third highest tone energy value is high enough.

In actual application, in order to prevent the demodulation efficiency from being affected by tone interference with each other, the frequency corresponding to the first tone data 701, the second tone data 702 and the third tone data 703 are preferably separated from each other as much as possible, and the preset sampling frequencies of tone frequency drift detection modules can be designed to correspond to the frequencies of the plurality of pieces of tone data, one by one, so that the tone energy value calculated by the tone frequency drift detection module for the multi-tone signal 705 not carrying the sampling frequency of the tone frequency drift detection module can be lower than the tone energy value calculated by the tone frequency drift detection module for the multi-tone signal 705 carrying the sampling frequency of the tone frequency drift detection module. Next, in a step S32, the tone determining module 44 determines whether the top two tone energy values are two obvious peak values. In other implementations, when the multi-tone signal 705 is generated by modulating at least three pieces of tone data, the tone determining module 44 determines whether the top three tone energy values are three obvious peak values in the step S32, and so on.

In a step S33, the tone determining module 44 can determine whether the difference between the top two tone energy values is small enough; when the difference between the top two tone energy values is small enough, the operational flow enters a step S34; when the difference between the top two tone energy values is not small enough, the operational flow enters a step S37. In an embodiment, the tone determining module 44 can comprise a second preset ratio, and determine whether the ratio of the highest tone energy value to the second highest tone energy value is lower than the second preset ratio, and when the ratio of the highest tone energy value to the second highest tone energy value is lower than the second preset ratio, the tone determining module 44 determines that the difference between the top two tone energy values is small enough. In the embodiment, the modulation device 11 uses two pieces of tone data to generate the multi-tone signal 705, so the highest tone energy value and the second highest tone energy value should be close to each other; otherwise, the second highest tone energy value is possibly caused by environmental noise, not modulation of tone data. In other implementations, when the multi-tone signal 705 is generated by modulating at least three pieces of tone data, the tone determining module 44 determines whether the difference between the top three tone energy values is small enough in the step S33, and so on.

In a step S34, the tone determining module 44 can determine whether the top two tone energy values are higher than a preset energy value, and when the top two tone energy values are higher than the preset energy value, the operational flow enters a step S35, and when the top two tone energy values are higher than the preset energy value, the operational flow enters a step S37. In the embodiment, the modulation device 11 uses two pieces of tone data to generate the multi-tone signal 705, so the tone energy values of the highest tone energy value and the second highest tone energy value must be high enough; otherwise, the tone energy value is possibly caused by environmental noise, and not modulation of the tone data.

In a step S35, the tone determining module 44 can determine whether the tone drift values outputted from the tone frequency drift detection modules, which generates the top two tone energy values, are consistent, and when the tone drift values are consistent, the operational flow enters a step S36; when the tone drift values are not consistent, the operational flow enters the step S37. For example, when both of the tone drift values outputted from the tone frequency drift detection modules generating the top two tone energy values are "1" or both are "4", the tone determining module 44 can determine that the tone drift values are the same, and the operational flow enters the step S36; otherwise, the tone drift values outputted from the tone frequency drift detection modules generating the top two tone energy values include "1" and "4", the tone determining module 44 can determine that the tone drift values are not the same, and the operational flow enters the step S37.

When the frequency drift effect occurs, the effect applied on the filter units of all tone frequency drift detection modules should be consistent; for this reason, when the tone drift values outputted from the tone frequency drift detection modules generating the top two tone energy values are consistent, it indicates that the effect is caused by frequency drift; otherwise, when the tone drift values outputted from the tone frequency drift detection modules generating the top two tone energy values are inconsistent, it indicates that the at least one tone energy value is caused by noise, so the data processor should not decode the tone data corresponding to the top two tone energy values, thereby preventing from generating wrong command.

In a step S36, the tone determining module 44 outputs the two pieces of tone data corresponding to the top two tone energy values to the command decoding module 45, so as to generate the execution command 451. In the step S37, the tone determining module 44 stops the determination flow and waits next tone energy value and next tone drift value.

Figure 5:
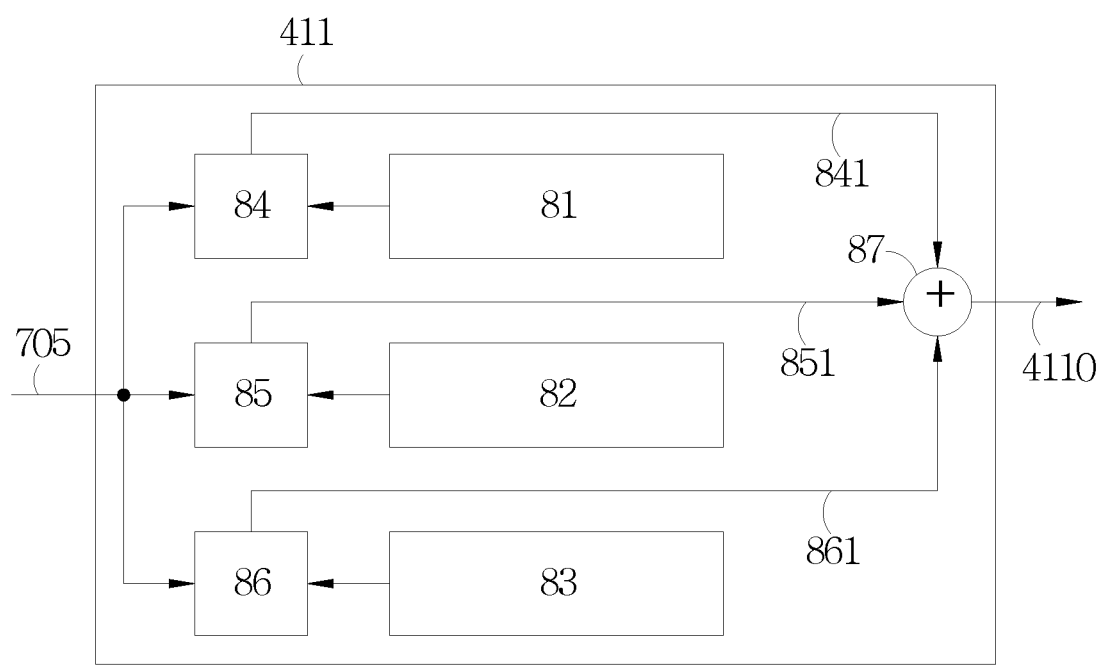
FIG. 5 is a block diagram of an embodiment of a filter unit of a tone frequency drift detection module of the present invention.
Figure 6:
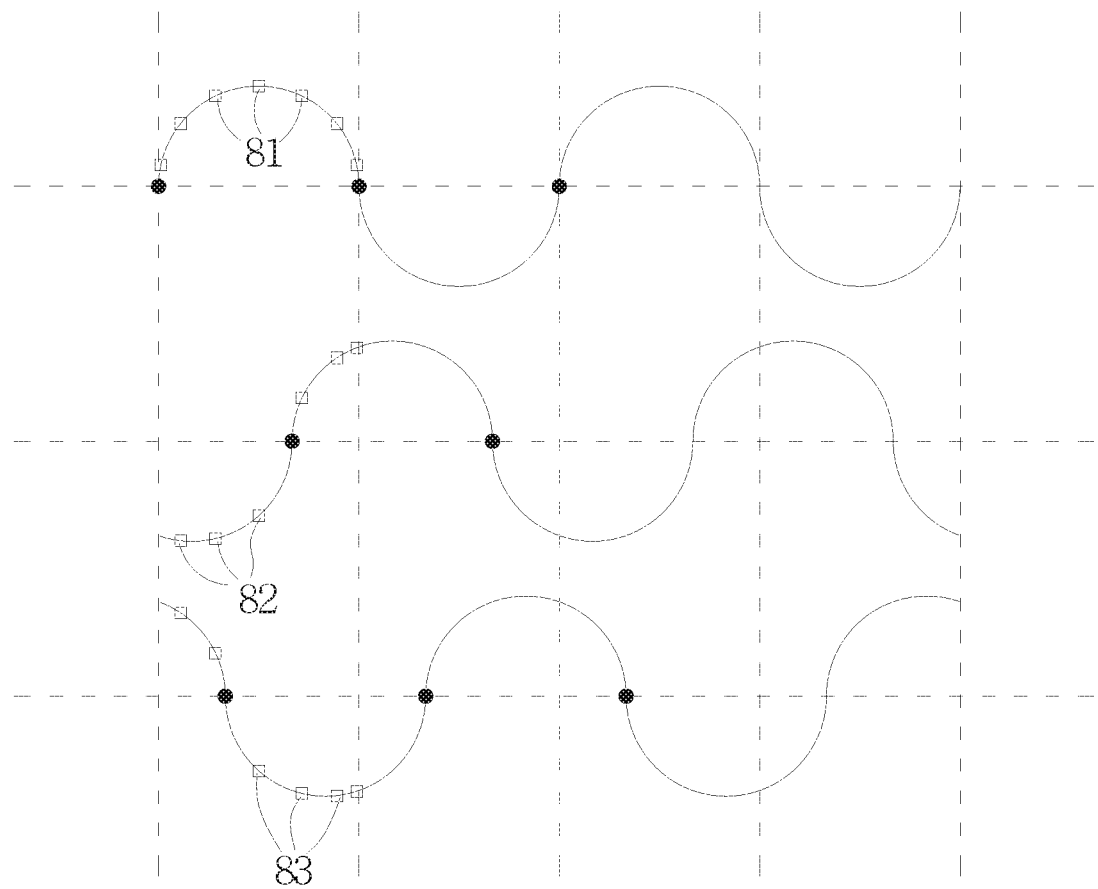
FIG. 6 is a schematic view of an embodiment of a sin-wave data table of the present invention.

Please refer to FIGS. 5 and 6, which are a block diagram of an embodiment of a filter unit of a tone frequency drift detection module of the present invention, and a schematic view of an embodiment of a sin-wave data table of the present invention. As shown in FIG. 5, the first filter unit 411 comprises a first sin-wave data table 81, a second sin-wave data table 82, a third sin-wave data table 83, a first correlation calculating unit 84, a second correlation calculating unit 85 and a third correlation calculating unit 86. The first correlation calculating unit 84 performs correlation calculation on the multi-tone signal 705 and the first sin-wave data table 81, so as to generate a first correlation value 841.

The sin-wave data tables 81 to 83 record multiple pieces of sampling point data of sin waves having different phases, respectively, as shown in FIG. 6 and the equations (1) to (3) below.

The pieces of the sampling point data recorded in the first sin-wave data table 81:

$$S_{X0i} = \text{Sin}(2\pi FX \cdot i \cdot T_S) \tag{1}$$

The pieces of the sampling point data recorded in the second sin-wave data table 82:

$$S_{X120i} = \text{Sin}(2\pi FX \cdot i \cdot TS + 120°) \tag{2}$$

The pieces of sampling point data recorded in the third sin-wave data table 83;

$$S_{X240i} = \text{Sin}(2\pi FX \cdot i \cdot TS + 240°) \tag{3}$$

Where FX is the frequency of the sine wave, TS is a unit time, and i is an integer.

The phase different between the pieces of sin-wave data recording in the second sin-wave data table 81, and the pieces of sin-wave data recording in the second sin-wave data table 82, and the pieces of sin-wave data recording in the third sin-wave data table 83 are 120° and 240°, respectively, as shown in FIG. 6.

The first correlation calculating unit 84 multiplies the pieces of sampling point data Pi of the multi-tone signal 705 and the pieces of sampling point data $S_{X0i}$ recorded in the first sin-wave data table 81, respectively, and adds the multiplication results to obtain a sum, and then calculate square of the sum to obtain the first correlation value 841. The first correlation value 841 can be represented as: $(\Sigma P_i \cdot S_{X0i})^2$.

Similarly, the second correlation calculating unit 85 can perform correlation calculation on the multi-tone signal 705 and the second sin-wave data table 82, to generate a second correlation value 851, and the third correlation calculating unit 86 can perform correlation calculation on the multi-tone signal 705 and the third sin-wave data table 83, to generate a third correlation value 861. The adder 87 sums up the first correlation value 841, the second correlation value 851 and the third correlation value 861, to generate a tone energy value 4110.

The aforementioned structure of the first filter unit 411 is also applicable to the second filter unit 412, the third filter unit 413, the fourth filter unit 414 and the fifth filter unit 415, so the detailed descriptions are not repeated.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A multi-tone communication system, comprising:
   a modulation device comprising:
   a man-machine interface module configured to receive a control command;
   a data processor configured to store at least three pieces of tone data and a first correspondence table, and comprising a calculating unit configured to select at least two of the at least three pieces of tone data according to the first correspondence table, and use the selected at least two pieces of tone data to generate a multi-tone signal corresponding to the control command; and
   a speaker module configured to broadcast the multi-tone signal; and
   a demodulation device comprising:
   a sound receiving module configured to receive the multi-tone signal;
   a data processor configured to process the multi-tone signal to obtain the pieces of tone data of the multi-tone signal, and determine whether frequency drifts of the pieces of tone data are the same, wherein when the frequency drifts of the pieces of tone data are the same, the data processor decodes the pieces of tone data, to generate an execution command; and
   a controller configured to execute the execution command;
   wherein the first correspondence table records a corresponding relationship of the at least three pieces of tone data and a plurality of control commands.

2. The multi-tone communication system according to claim 1, wherein the modulation device is disposed in a movable device, and the speaker module is a speaker of the movable device, and an upper frequency limit of the at least three pieces of tone data is a highest frequency emitted by the speaker.

3. The multi-tone communication system according to claim 1, wherein the demodulation device is disposed in an alarm system, the sound receiving module is a microphone of the alarm system, and the controller executes the execution command to control the alarm system.

4. The multi-tone communication system according to claim 1, wherein the data processor comprise at least three tone frequency drift detection modules, a tone determining module and a command decoding module, and the at least three tone frequency drift detection modules perform energy calculation and frequency drift detection on the multi-tone signal, to generate a plurality of tone energy values and a plurality of tone drift values, respectively, the tone determining module determines, according to the plurality of tone energy values and the plurality of tone drift values, whether the multi-tone signal is generated by modulating at least two pieces of tone data, and the command decoding module comprises a second correspondence table, and when the tone determining module determines that the multi-tone signal is generated by modulating at least two pieces of tone data, the command decoding module decodes a determination result of the tone determining module according to the second correspondence table, to generate the execution command, wherein the second correspondence table records a corresponding relationship of the plurality of pieces of tone data and a plurality of execution commands.

5. The multi-tone communication system according to claim 4, wherein each of the at least three tone frequency drift detection modules comprises a plurality of filter units and a selecting unit, the plurality of filter unit have different sampling frequencies, and each of the plurality of filter units performs energy calculation on the multi-tone signal, to generate an energy value, the selecting unit selects a maximal energy value from the plurality of energy values calculated by the plurality of filter units, and output the maximal energy value serves as the tone energy value, and the selecting unit of each of the at least three tone frequency drift detection modules outputs an ID code of the filter unit calculating the maximal energy values, as the tone drift value.

6. The multi-tone communication system according to claim 5, wherein each of the filter units comprises a plurality of sin-wave data tables, a plurality of correlation calculating units and an adder, and the plurality of correlation calculating units performs correlation calculation on the multi-tone signal according to the plurality of sin-wave data tables, respectively, so as to generate a plurality of correlation values, and the adder sums up the plurality of correlation values, to generate the energy value.

7. A multi-tone signal demodulation device, comprising:
   a sound receiving module configured to receive a multi-tone signal;
   a data processor configured to process the multi-tone signal to obtain at least two pieces of tone data of the multi-tone signal, and determine whether frequency drifts of the at least two pieces of tone data are the same, and when the frequency drifts of the at least two pieces of tone data are the same, the data processor decodes the at least two pieces of tone data, to generate an execution command; and
   a controller configured to execute the execution command.

8. The multi-tone signal demodulation device according to claim 7, wherein the data processor comprises at least three tone frequency drift detection modules configured to perform calculation on the multi-tone signal, to generate a plurality of tone energy values and a plurality of tone drift values, respectively, and each of the at least three tone frequency drift detection modules comprises a plurality of filter units and a selecting unit, the plurality of filter units have different sampling frequencies, and each of the plurality of filter units performs energy calculation on the multi-tone signal, to generate an energy value, the selecting unit selects a maximal energy values from the plurality of energy values calculated by the plurality of filter units, and outputs the maximal energy values as the tone energy value, and the selecting unit outputs an ID code of the filter unit calculating the maximal energy values as the tone drift value.

9. The multi-tone signal demodulation device according to claim 7, wherein when the data processor determines that the frequency drifts of the at least two pieces of tone data are not the same, the data processor does not decode the at least two pieces of tone data.

10. A multi-tone signal demodulation method, comprising:
    receiving a multi-tone signal;
    processing the multi-tone signal, to obtain at least two pieces of tone data;
    calculating frequency drifts of the at least two pieces of tone data;
    determining whether the frequency drifts of the at least two pieces of tone data are the same; and
    decoding the at least two pieces of tone data to generate an execution command when the frequency drifts of the at least two pieces of tone data are the same.

* * * * *